United States Patent Office 3,305,915
Patented Feb. 28, 1967

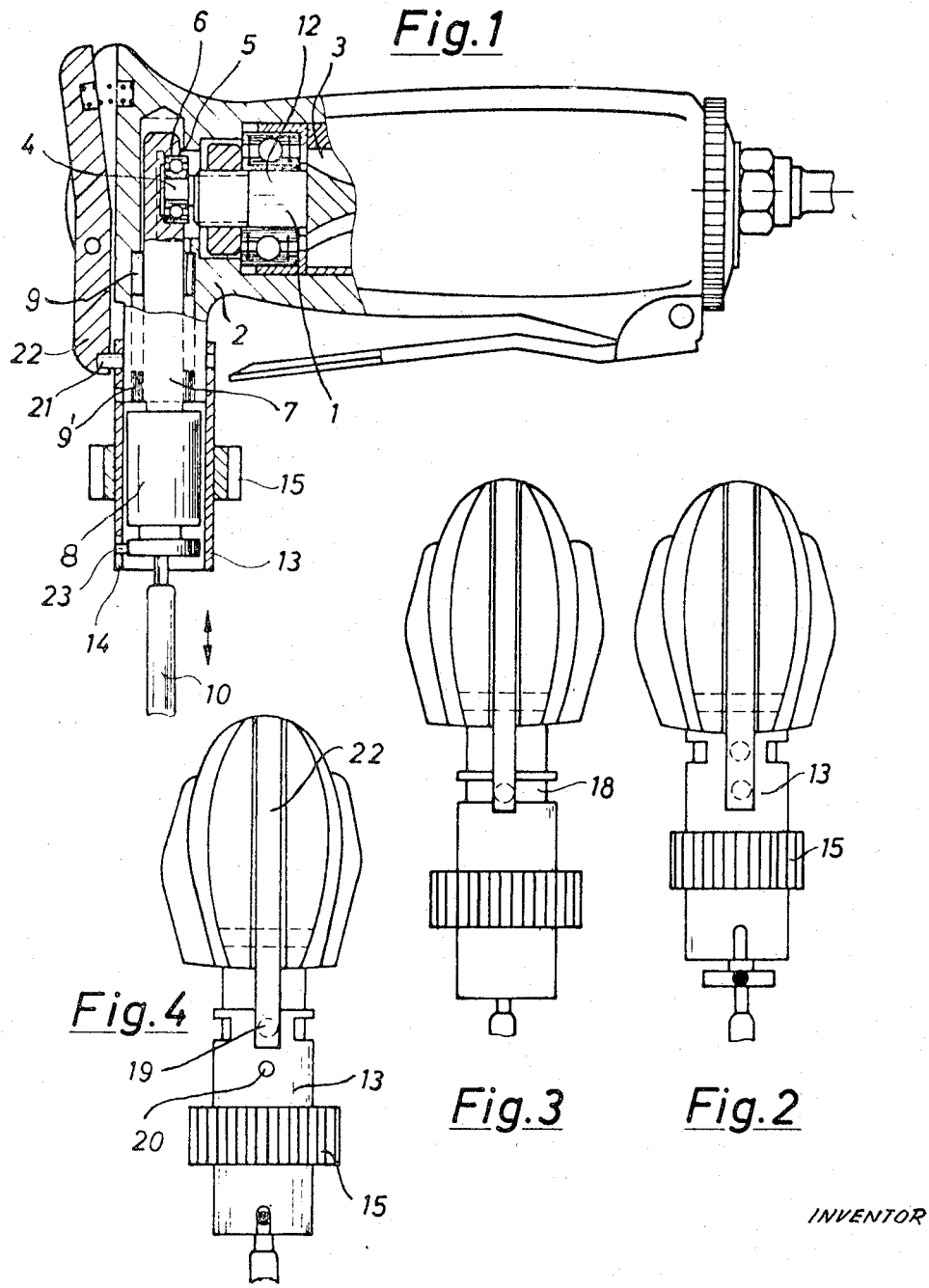

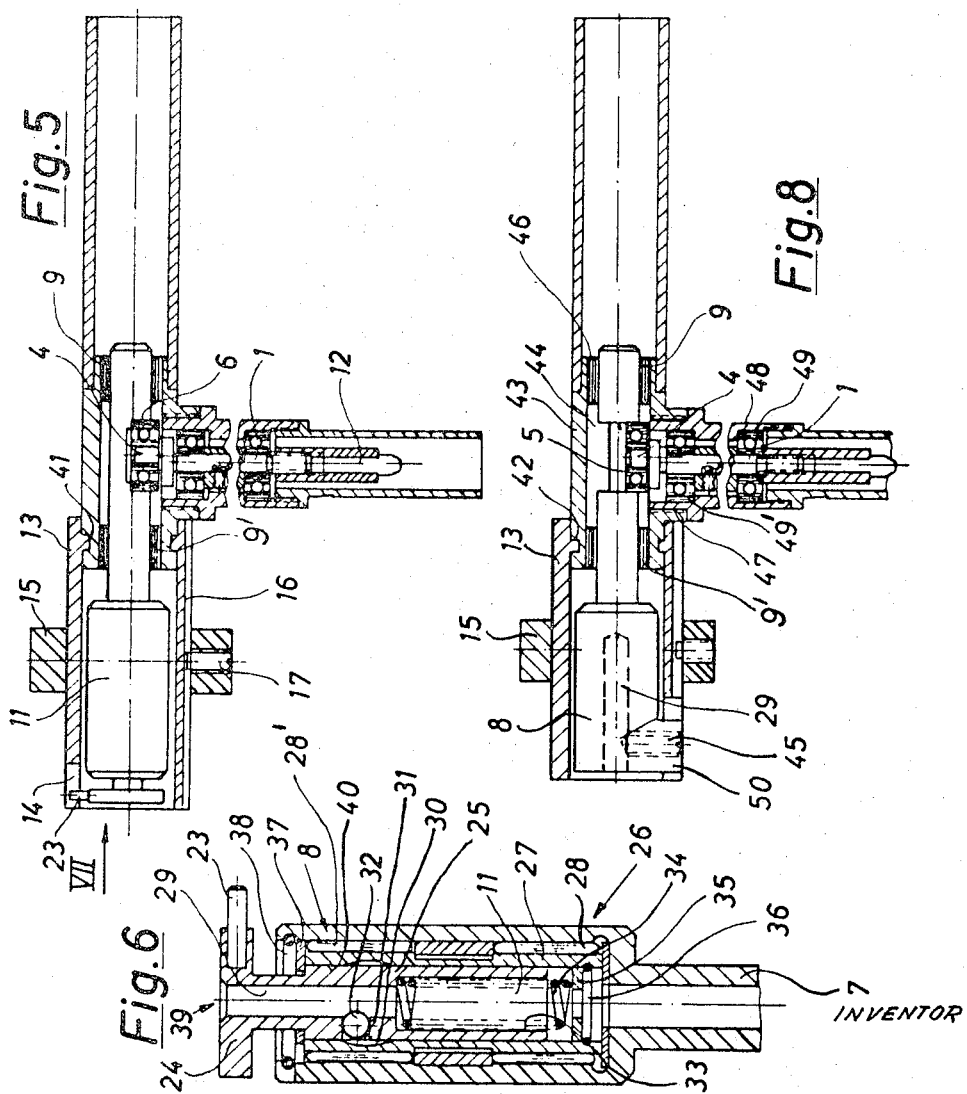

3,305,915
FILING MACHINE
Paul Belzner, Maulbronn, Germany, assignor to Schmid & Wezel, Maulbronn, Baden-Wurttemberg, Germany
Filed June 8, 1966, Ser. No. 556,094
Claims priority, application Germany, Sept. 30, 1965, Sch 37,796
11 Claims. (Cl. 29—76)

This invention relates to a filing machine, which comprises a reciprocable chuck for gripping the file so that said file is freely rotatable about the axis of the chuck and is rotatably adjustable by a sleeve. In a known machine of this kind, the drive means comprises a connecting rod, which is connected to an eccentric and which reciprocates the chuck by means of a spring.

To simplify the drive, the invention provides a stem extension, which is directly connected to the chuck and is formed in its periphery with a recess for receiving an eccentric. This feature results in a particularly simple structure of the machine. The number of parts is reduced. The assembling is facilitated. The entire structure is particularly rugged and durable.

In a preferred embodiment, the stem extension is mounted in bearings in a through bore of a T-shaped housing part and a bearing block is in threaded engagement with a bore formed in said housing part and extending at right angles to said through bore, said bearing block being provided with anti-friction bearings, in which the drive spindle is rotatably mounted. The recess for the eccentric is mounted between the bearings of the stem extension. The chuck and the stem extension may be integral with each other and the recess in the stem extension may be an annular groove. In this case the file is adapted to be gripped by a set screw.

The operation of the tool can be further simplified according to the invention if the chuck constitutes a quick-gripping chuck and is rotatably mounted in the stem extension. In this case, the chuck comprises a bearing sleeve, which is mounted in the stem extension, and a spring-loaded stem, which is axially movable in said sleeve. The bearing sleeve is formed on the inside with a conical recess and the stem is formed with a bore, which accommodates a clamping ball. Filing work requires a relatively frequent exchange of the file so that it is important that the files can be simply and quickly exchanged. At its end provided with the bore for the file, the stem may suitably be provided with a flange having a pin, which is guided in a slot formed in the sleeve, and the stem may be provided at the opposite end with a recess for receiving and guiding a spring, which bears on a disc connected to the bearing sleeve. To release the file, the stem is only forced back so that the ball can yield into the conical recess. The tool is automatically clamped due to the action of the compression spring. To simplify the adjustment, the sleeve may be displaceably and rotatably mounted in the housing and may be formed with a part-annular, peripheral groove and with bores, which groove and bores are engageable by a pin carried by a lever, which is pivoted to the housing. The reciprocating file is thus mounted in the housing for free rotation or for rotation by hand and can be locked relative to the housing.

Further features of the invention will become apparent from the subclaims and the following description of several embodiments shown by way of example in the accompanying drawing, in which—

FIG. 1 is a sectional view showing a filing machine,
FIGS. 2 to 4 are elevations showing the machine in different positions of the control sleeve,
FIG. 5 is a sectional view showing a second embodiment of the machine,
FIG. 6 is a sectional view showing a quick-clamping chuck on a larger scale,
FIG. 7 a front elevation showing the chuck as viewed in the direction of arrow VII in FIG. 5,
FIG. 8 a sectional view showing a third embodiment,
FIG. 9 a front elevation showing the third embodiment in a front elevation similar to FIG. 7.

In the embodiment shown in FIG. 1, the drive spindle 1 is mounted in a housing 2 and driven by a compressed-air motor 3. The drive spindle 1 carries at its forward end an eccentric 4, which engages by means of a ball bearing 5 a recess 6 formed in a stem extension 7 of the chuck 8. The stem extension 7 is mounted in journal bearings 9, 9'.

For filing work, the file 10 to be gripped in the chuck 8 is both reciprocable and rotatable to enable an adjustment to the profile to be filed. For this reason the chuck is rotatable with the file about the axis 11 of the chuck 8, which axis is at right angles to the axis 12 of the drive spindle 1.

A sleeve 13 is axially movably and rotatably mounted in the housing 2 and formed at its forward end with a slot 14, which is parallel to the axis 11. A grip 15 is fixedly or axially displaceably mounted on the sleeve 13. This grip may have a square-section outside periphery. A screw 17 extends into a longitudinal groove 16 to lock the grip 15 on the sleeve 13. At the end which is opposite to the slot 14, the sleeve 13 is formed with a part-annular, peripheral groove 18 and two bores 19, 20, which are adapted selectively to receive a pin 21 of a lever 22, which is mounted on the housing 2.

It is shown in FIGS. 2 to 4 how the freedom of movement of the file 10 is influenced by the individual positions of the sleeve 13. FIG. 2 shows the sleeve 13 in its uppermost position, in which the pin 21 engages the bore 20. The slot 14 of the sleeve 13 is then disengaged from a pin 23, which is connected by a flange 24 to a stem 25 of the chuck 8. In this case, the sleeve 13 is locked and the file 10 is freely rotatable so that it can automatically follow the contours of a workpiece to be machined, which may be of any desired shape. In the position shown in FIG. 3, the sleeve 13 is displaced downwardly so that the pin 23 enters the slot 14. The pin 21 is guided in the part-annular peripheral groove 18, so that the sleeve 13 is rotatable but axially fixed. In this case the file 10 can be rotated by hand as desired by means of the grip 15 and the sleeve 13. A rigid lock is obtained in the position of FIG. 4, which shows the pin 21 locked in the bore 19 so that neither the sleeve 13 nor the file 10 can be rotated relative to the housing 2. Now a movement of the entire machine is required for an adaptation of the file 10 to the surface to be machined.

A quick and simple exchange of the files is of great importance for the subject matter of the invention. For this reason the chuck 8 may constitute a quick-gripping chuck, as is indicated at 26. In this case, the stem extension 7 is enlarged at its forward end to form a cup, in which a bearing sleeve 27 is mounted with needle bearings 28, 28'. A stem 25 is slidably mounted in the bearing sleeve 27 and formed with a bore 29 for receiving the file 10. The bearing sleeve 27 is formed with a turned, conical recess 30, which has double conical surfaces. One radial bore 31 is, or preferably a plurality of such bores are, formed in the stem 25 and contain clamping balls 32, which have the same diameter as the bores 31. The axial distance from the bottom of the conical recess 30 to the inside surface of the bore 29 is at least as large as the diameter of the bore 29. A compression spring 34 is seated in a recess 33 of the stem 25. The free end of this spring bears on a disc 35, which is held by a spring ring 36 in the bearing sleeve 27. The needle bearings 28, 28', the bearing sleeve 27 and the stem 25 are held in the cup of the stem extension 7 by a disc 37 and a spring ring 38.

The tool which is clamped by the balls 32 in the bore 29 is freely rotatable with the stem 25 in the needle bearings 28. To exchange the file 10, pressure is applied to the stem at the end 39 provided with the file bore 29 so that the stem 25 slides on the inside surface 40 of the bearing sleeve 27 and the clamping ball 32 can yield as far as to the lowest point of the conical recess 30. When the new tool has been inserted, the stem 25 is released so that it is urged forwardly in the bearing sleeve by the compression spring 34, and the clamping balls 32 are wedged by the conical surfaces of the recesses 30.

In the embodiment of FIG. 5, the drive spindle 1 provided with the eccentric 4 is mounted between the journal bearings 9, 9'. This arrangement results in a high stability. The sleeve 13 has inwardly directed projections 41, which are received by a groove 42 in a fixed housing member 43 so that the sleeve 13 is held against longitudinal movement. In this case the file 10 can only be moved by hand by means of the grip 15.

Even if the chuck 8 or the stem 25 is integral with the stem extension 7, the file may be rotatable by hand by means of the grip 15, as is particularly apparent from FIG. 8. In this case the recess 6 consists of an annular peripheral groove 44, in which the outer race of the ball bearing 5 is rotatably mounted. In this case the tool is inserted into the bore 29 of the chuck 8 and is fixed by a set screw 45, which is at right angles to said bore.

The fixed housing part 43 is T-shaped. The bearings 9, 9' are mounted in the through bore 46. A bearing block 48 is screw-threaded in a bore 47, which is at right angles to the through bore 46. The bearing block 48 contains anti-friction bearings 49, 49' for the drive spindle 1.

FIGS. 7 and 9 show particularly the square shape of the grip 15 and the guidance of the pin 23 of the stem 25 or of a lug 50 of the chuck 8 in the slot 14 of the sleeve 13.

What is claimed is:

1. A filing machine which comprises a housing, a chuck carried by said housing and rotatable relative to said housing about the axis of said chuck, a stem extension which extends axially from said chuck and is axially movably mounted in said housing and axially coupled to said chuck, said stem extension being formed in its periphery with a recess, said machine further comprising a drive eccentric rotatably mounted in said housing on an axis which is at an angle to the axis of said chuck and engaging said recess, whereby a rotation of said eccentric results in an axial reciprocation of said stem extension and chuck.

2. A filing machine as set forth in claim 1, in which said eccentric is mounted on a drive spindle rotatably mounted in said housing and having an axis which is at right angles to the axis of said chuck.

3. A filing machine as set forth in claim 2, in which said housing has a T-shaped part having a flange portion and a stem portion, said stem portion is formed with a through bore, said stem extension is mounted in said through bore, said flange portion is formed with a second bore at right angles to said through bore, said drive spindle is mounted in anti-friction bearings, and said anti-friction bearings are mounted in a bearing block, which is in screw-threaded engagement with said second bore.

4. A filing machine as set forth in claim 1, which comprises bearings axially guiding said stem extension and in which said recess is disposed between said bearings.

5. A filing machine as set forth in claim 1, in which said chuck comprises a member which is integral with said stem extension and said recess in said stem extension consists of a peripheral annular groove.

6. A filing machine as set forth in claim 5, in which said chuck comprises a set screw for fixing said file in said chuck.

7. A filing machine as set forth in claim 1, in which said chuck constitutes a quick-gripping chuck and said stem extension and chuck are connected for rotation relative to each other about the axis of said chuck.

8. A filing machine as set forth in claim 7, in which said chuck comprises a bearing sleeve, which is rotatably mounted in said stem extension, a spring-loaded stem, which is mounted in said sleeve for axial movement relative thereto and has an axial bore, which is open at the end opposite to said stem extension, said bearing sleeve is internally formed with at least one conical recess, said stem is formed adjacent to said conical recess with at least one transverse bore, which extends from the outside of said stem to said axial bore, and said chuck comprises a clamping ball mounted in said transverse bore and adapted to protrude into and to clear said axial bore, depending on the axial position of said stem relative to said sleeve.

9. A filing machine as set forth in claim 8, in which said stem is provided near its end remote from said housing with a radially extending pin and at the other end with a recess, said bearing sleeve is provided with a disc, a spring bears on said disc and is received and guided by said recess, and which comprises a rotatable control sleeve surrounding said stem extension and formed with an axially extending slot, which is adapted to receive and guide said pin.

10. A filing machine as set forth in claim 1, which comprises a control sleeve surrounding said stem extension and provided on its outside periphery with a grip and formed with radially inwardly directed projecting means, said housing being formed with a peripheral annular groove interengaging with said projecting means, and means being provided for connecting said sleeve and chuck for joint rotation.

11. A filing machine as set forth in claim 1, which comprises a control sleeve, which surrounds said stem extension and is rotatably and axially movably connected to said housing and formed with a part-annular, peripheral groove and transverse bores spaced from each other and from said groove in the axial direction of said sleeve, said machine comprising a lever pivoted to said housing and carrying a pin selectively engageable with said groove and said bores.

No references cited.

WILLIAM W. DYER, JR., *Primary Examiner.*

HARISSON L. HINSON, *Examiner.*